United States Patent
Bankoski et al.

(10) Patent No.: US 8,938,001 B1
(45) Date of Patent: Jan. 20, 2015

(54) APPARATUS AND METHOD FOR CODING USING COMBINATIONS

(75) Inventors: James Bankoski, Wynantskill, NY (US); Scott LaVarnway, Warrensburg, NY (US); Paul Wilkins, Cambridge (GB); Yaowu Xu, San Diego, CA (US)

(73) Assignee: Google Inc., Mountain View, CA (US)

( * ) Notice: Subject to any disclaimer, the term of this patent is extended or adjusted under 35 U.S.C. 154(b) by 389 days.

(21) Appl. No.: 13/080,240

(22) Filed: Apr. 5, 2011

(51) Int. Cl.
*H04N 7/12* (2006.01)

(52) U.S. Cl.
USPC ............... 375/240.02; 375/240.16

(58) Field of Classification Search
CPC ............ H04N 19/00121; H04N 19/00278
See application file for complete search history.

(56) References Cited

U.S. PATENT DOCUMENTS

| | | |
|---|---|---|
| 4,710,810 A | 12/1987 | Koga |
| 5,091,782 A | 2/1992 | Krause et al. |
| 5,150,209 A | 9/1992 | Baker et al. |
| 5,341,440 A | 8/1994 | Earl et al. |
| 5,461,423 A | 10/1995 | Tsukagoshi |
| 5,650,782 A | 7/1997 | Kim |
| 5,686,962 A | 11/1997 | Chung et al. |
| 5,708,473 A | 1/1998 | Mead |
| 5,737,020 A | 4/1998 | Hall et al. |
| 5,767,909 A | 6/1998 | Jung |
| 5,777,680 A | 7/1998 | Kim |
| 5,818,536 A | 10/1998 | Morris et al. |
| 5,886,652 A | 3/1999 | Adachi et al. |
| 5,926,226 A | 7/1999 | Proctor et al. |
| 6,115,501 A | 9/2000 | Chun et al. |
| 6,125,144 A | 9/2000 | Matsumura et al. |
| 6,157,326 A | 12/2000 | Van Der Vleuten et al. |
| 6,212,234 B1 | 4/2001 | Andoh et al. |
| 6,256,423 B1 | 7/2001 | Krishnamurthy et al. |
| 6,314,208 B1 | 11/2001 | Konstantinides et al. |
| 6,414,995 B2 | 7/2002 | Okumura et al. |
| 6,418,166 B1 | 7/2002 | Wu et al. |
| 6,434,197 B1 | 8/2002 | Wang et al. |
| 6,473,463 B2 | 10/2002 | Agarwal |
| 6,501,860 B1 | 12/2002 | Charrier et al. |

(Continued)

FOREIGN PATENT DOCUMENTS

| | | |
|---|---|---|
| EP | 1351510 | 8/2003 |
| EP | 1768415 | 3/2007 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Joseph Ustaris
*Assistant Examiner* — Zhubing Ren
(74) *Attorney, Agent, or Firm* — Young, Basile, Hanlon & MacFarlane, P.C.

(57) ABSTRACT

Disclosed herein is a method for encoding data by determining a range where the data includes a sequence of symbols each associated with a probability of occurrence are disclosed herein. The method includes initializing the range, identifying a symbol set from the sequence of symbols, selecting at least one pre-calculated range adjustment vector based on the identified symbol set, adjusting the range using the pre-calculated range adjustment vector and encoding the identified symbol set based on the adjusted range.

17 Claims, 13 Drawing Sheets

(56) References Cited

U.S. PATENT DOCUMENTS

| | | |
|---|---|---|
| 6,522,784 B1 | 2/2003 | Zlotnick |
| 6,570,924 B1 | 5/2003 | Lynch et al. |
| 6,661,842 B1 | 12/2003 | Abousleman |
| 6,661,925 B1 | 12/2003 | Pianykh et al. |
| 6,782,053 B1 | 8/2004 | Lainema |
| 6,856,701 B2 | 2/2005 | Karczewicz et al. |
| 6,907,079 B2 | 6/2005 | Gomila et al. |
| 6,917,651 B1 | 7/2005 | Yoo et al. |
| 6,934,419 B2 | 8/2005 | Zlotnick |
| 6,985,527 B2 | 1/2006 | Gunter et al. |
| 7,010,032 B1 | 3/2006 | Kikuchi et al. |
| 7,085,425 B2 | 8/2006 | Christopoulos et al. |
| 7,116,831 B2 | 10/2006 | Mukerjee et al. |
| 7,226,150 B2 | 6/2007 | Yoshimura et al. |
| 7,432,329 B2 | 10/2008 | Haubennestel et al. |
| 7,496,143 B2 | 2/2009 | Schwarz et al. |
| 7,843,998 B2 | 11/2010 | Bjontegaard |
| 2001/0022815 A1 | 9/2001 | Agarwal |
| 2002/0009153 A1 | 1/2002 | Jeon et al. |
| 2002/0036705 A1 | 3/2002 | Lee et al. |
| 2002/0071485 A1 | 6/2002 | Caglar et al. |
| 2002/0080871 A1 | 6/2002 | Fallon et al. |
| 2002/0168114 A1 | 11/2002 | Valente |
| 2002/0172289 A1 | 11/2002 | Akiyoshi et al. |
| 2003/0081850 A1 | 5/2003 | Karczewicz et al. |
| 2003/0215018 A1 | 11/2003 | MacInnis et al. |
| 2004/0013308 A1 | 1/2004 | Jeon et al. |
| 2004/0120398 A1 | 6/2004 | Zhang et al. |
| 2004/0131117 A1 | 7/2004 | Sheraizin et al. |
| 2004/0234144 A1 | 11/2004 | Sugimoto et al. |
| 2005/0152459 A1* | 7/2005 | Lobo et al. ............... 375/240.28 |
| 2005/0180500 A1 | 8/2005 | Chiang et al. |
| 2005/0276323 A1 | 12/2005 | Martemyanov et al. |
| 2006/0001557 A1* | 1/2006 | Liao ................................ 341/60 |
| 2006/0098738 A1 | 5/2006 | Cosman et al. |
| 2006/0126724 A1 | 6/2006 | Cote et al. |
| 2007/0025441 A1 | 2/2007 | Ugur et al. |
| 2007/0127831 A1* | 6/2007 | Venkataraman ............... 382/239 |
| 2007/0177673 A1 | 8/2007 | Yang |
| 2008/0181299 A1 | 7/2008 | Tian et al. |
| 2008/0310503 A1 | 12/2008 | Lee et al. |
| 2008/0310745 A1 | 12/2008 | Ye et al. |
| 2010/0054328 A1* | 3/2010 | Nozawa .................... 375/240.01 |
| 2010/0097250 A1* | 4/2010 | Demircin et al. ............. 341/107 |
| 2010/0098169 A1 | 4/2010 | Budagavi |
| 2010/0290568 A1* | 11/2010 | Suzuki et al. ................. 375/341 |

FOREIGN PATENT DOCUMENTS

| | | |
|---|---|---|
| JP | 07135660 | 5/1995 |
| JP | 2002290743 | 10/2002 |
| JP | 20030235044 | 8/2003 |
| KR | 100213018 | 8/1999 |
| WO | 0150770 | 7/2001 |
| WO | 03026315 | 3/2003 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4. Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2007.

"Implementors' Guide; Series H: Audiovisual and Multimedia Systems; Coding of moving video: Implementors Guide for H.264. Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Park, Jun Sung, et al. "Selective Intra Prediction Mode Decision for h.264/AVC Encoders", World Academy of Science, Engineering and Technology 13, (2006).

* cited by examiner

| RANGE LENGTH | N (COMBINATION) | INCREMENT/ DECREMENT VALUE | ADJUSTMENT LENGTH | COUNT |
|---|---|---|---|---|
| 128 | 0 ("000") | $X_0$ | $Y_0$ | $Z_0$ |
| 128 | 1 ("001") | $X_1$ | $Y_1$ | $Z_1$ |
| 128 | 2 ("010") | $X_2$ | $Y_2$ | $Z_2$ |
| 128 | 3 ("011") | $X_3$ | $Y_3$ | $Z_3$ |
| 128 | 4 ("100") | $X_4$ | $Y_4$ | $Z_4$ |
| 128 | 5 ("101") | $X_5$ | $Y_5$ | $Z_5$ |
| 128 | 6 ("110") | $X_6$ | $Y_6$ | $Z_6$ |
| 128 | 7 ("111") | $X_7$ | $Y_7$ | $Z_7$ |
| 129 | 0 ("000") | $X_8$ | $Y_8$ | $Z_8$ |
| 129 | 1 ("001") | $X_9$ | $Y_8$ | $Z_8$ |
| 129 | 2 ("010") | $X_{10}$ | $Y_{10}$ | $Z_{10}$ |
| 129 | 3 ("011") | $X_{11}$ | $Y_{11}$ | $Z_{11}$ |
| 129 | 4 ("100") | $X_{12}$ | $Y_{12}$ | $Z_{12}$ |
| 129 | 5 ("101") | $X_{13}$ | $Y_{13}$ | $Z_{13}$ |
| 129 | 6 ("110") | $X_{14}$ | $Y_{14}$ | $Z_{14}$ |
| 129 | 7 ("111") | $X_{15}$ | $Y_{15}$ | $Z_{15}$ |
| ... | ... | ... | ... | ... |
| ... | ... | ... | ... | ... |
| ... | ... | ... | ... | ... |
| 255 | 0 ("000") | $X_{1016}$ | $Y_{1016}$ | $Z_{1016}$ |
| 255 | 1 ("001") | $X_{1017}$ | $Y_{1017}$ | $Z_{1017}$ |
| 255 | 2 ("010") | $X_{1018}$ | $Y_{1018}$ | $Z_{1018}$ |
| 255 | 3 ("011") | $X_{1019}$ | $Y_{1019}$ | $Z_{1019}$ |
| 255 | 4 ("100") | $X_{1020}$ | $Y_{1020}$ | $Z_{1020}$ |
| 255 | 5 ("101") | $X_{1021}$ | $Y_{1021}$ | $Z_{1021}$ |
| 255 | 6 ("110") | $X_{1022}$ | $Y_{1022}$ | $Z_{1022}$ |
| 255 | 7 ("111") | $X_{1023}$ | $Y_{1023}$ | $Z_{1023}$ |

FIG. 4

APPARATUS AND METHOD FOR CODING USING COMBINATIONS

BACKGROUND

Digital video is used for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including proprietary formats such as VPx (promulgated by Google Inc. of Mountain View, Calif.) and H.264, standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

Some current data coding systems use entropy coders for lossless data compression. Arithmetic coding is one form of entropy coding that can be used in lossless data compression. Arithmetic coders can, for example, represent a string of characters (which would normally be represented using a fixed number of bits per character) so that frequently used characters are stored with fewer bits and not-so-frequently occurring characters are stored with more bits. Commonly, the result is that fewer bits are used to represent the string of characters than would be otherwise.

More specifically, arithmetic coding can code the entire string of characters into a fractional value. Each individual data symbol can be, for example, encoded by representing each symbol in the string of characters by a range of values between 0 and 1. The size of the specific range can signify the probability of that symbol occurring. Arithmetic encoding is also recursive in that, on each recursion, the algorithm will further partition the range of values between 0 and 1 and retain one of the partitions as the new interval. The coded string of characters lies in the new interval. The string of characters is decoded by a series of comparisons to determine how the entropy coder successively partitioned and retained each nested subinterval.

SUMMARY

Embodiments of a method for encoding data by determining a range where the data includes a sequence of symbols each associated with a probability of occurrence and the range is indicative of the encoded data are disclosed herein. In one such embodiment the method includes, initializing the range, identifying a symbol set from the sequence of symbols, selecting at least one pre-calculated range adjustment vector based on the identified symbol set, adjusting the range using the pre-calculated range adjustment vector and encoding the identified symbol set based on the adjusted range.

Embodiments of an apparatus for encoding data by determining a range where the data includes a sequence of symbols each associated with a probability of occurrence, and the range is indicative of the encoded data. In one such embodiment the apparatus includes processor means for initializing the range, identifying a symbol set from the sequence of symbols, selecting at least one pre-calculated range adjustment vector based on the identified symbol set, adjusting the range using the pre-calculated range adjustment vector and encoding the identified symbol set based on the adjusted range.

Embodiments of a method for decoding data that has been encoded where the where the data is represented by at least one value in a range are disclosed herein. In one such embodiment the method includes initializing the range and selecting a pre-calculated adjustment vector based on where the at least one value lies in the range. The method also includes adjusting the range using the pre-calculated adjustment vector and determining a symbol set from the pre-calculated adjustment vector.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein:

FIG. 4 is a schematic diagram of a combination table for use in the video compression system of FIG. 2 and the video decompression system of FIG. 3;

DETAILED DESCRIPTION

Disclosed herein are embodiments of an entropy coder that permit increased speed efficiency during coding and/or decoding. Rather than, as described above, encoding or decoding one symbol at a time, the coder can encode and/or decode multiple symbols simultaneously. Details of the entropy coder will be described in additional detail hereafter.

Figure 1:
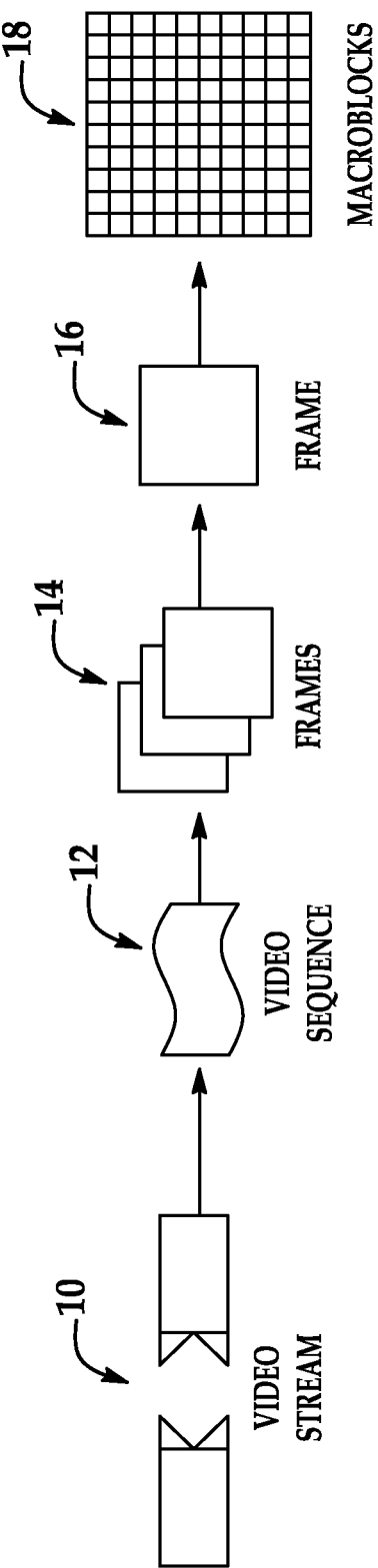
FIG. 1 is a schematic diagram of a video bitstream.

FIG. 1 is a diagram of a typical video bitstream 10 to be encoded and decoded. Video coding formats, such as VP8 or H.264, provide a defined hierarchy of layers for video stream 10. Video stream 10 includes a video sequence 12. At the next level, video sequence 12 consists of a number of adjacent frames 14, which can then be further subdivided into a single frame 16. At the next level, frame 16 can be divided into a series of macroblocks 18, which can contain data corresponding to, for example, a 16×16 block of displayed pixels in frame 16. Each macroblock can contain luminance and chrominance data for the corresponding pixels. Macroblocks 18 can also be of any other suitable size such as 16×8 pixel groups or 8×16 pixel groups.

Figure 2:
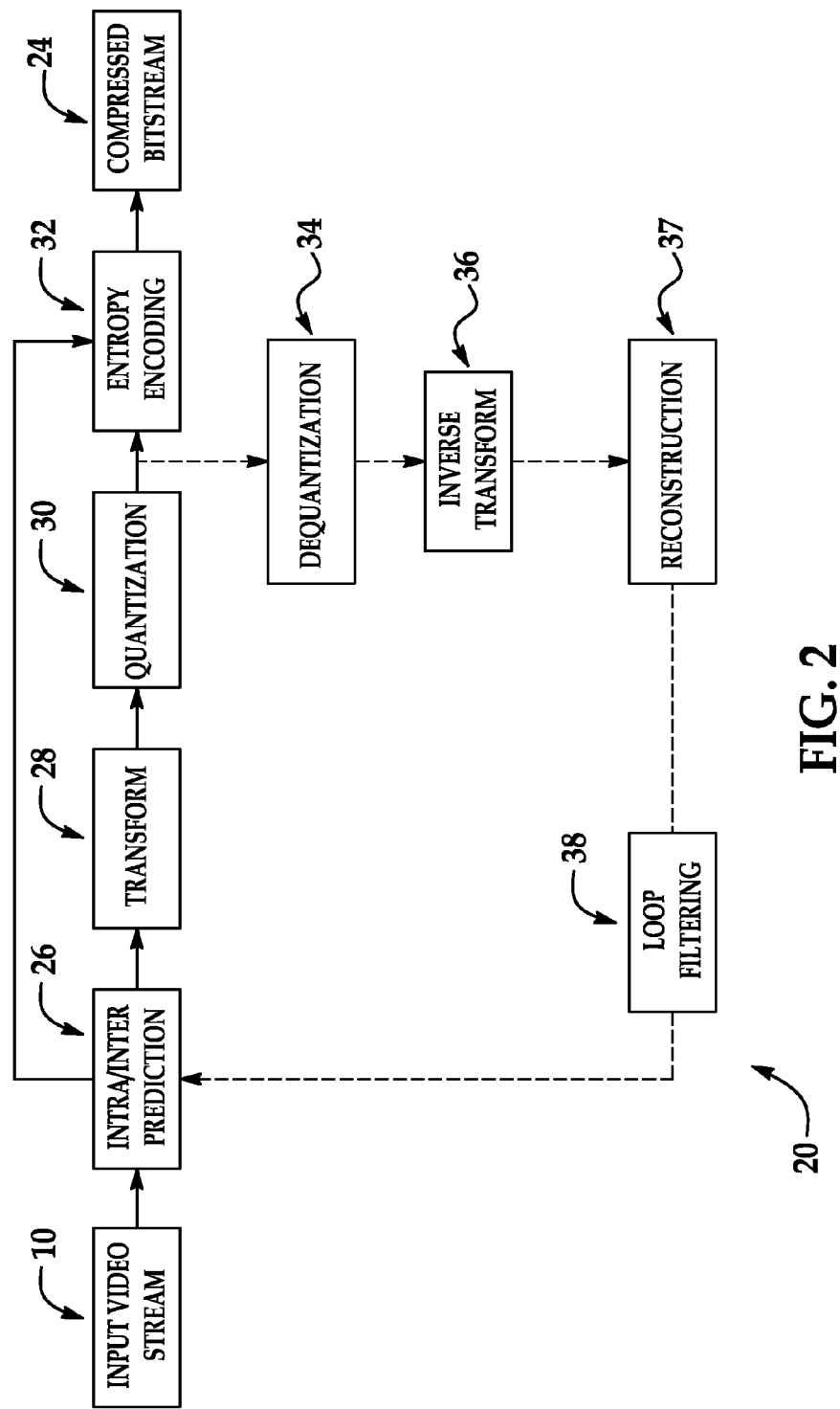
FIG. 2 is a block diagram of a video compression system in accordance with one embodiment.

FIG. 2 is a block diagram of a video compression system in accordance with one embodiment. An encoder 20 encodes an input video stream 10. Encoder 20 has the following stages to perform the various functions in a forward path (shown by the solid connection lines) to produce an encoded or compressed bitstream 24: an intra/inter prediction stage 26, a transform stage 28, a quantization stage 30 and an entropy encoding stage 32. Encoder 20 also includes a reconstruction path (shown by the dotted connection lines) to reconstruct a frame for encoding of further macroblocks. Encoder 20 has stages to perform the various functions in the reconstruction path: a dequantization stage 34, an inverse transform stage 36, a reconstruction stage 37 and a loop filtering stage 38.

When input video stream 10 is presented for encoding, each frame 16 within input video stream 10 is processed in units of macroblocks. At intra/inter prediction stage 26, each macroblock can be encoded using either intra-frame prediction (i.e., within a single frame) or inter-frame prediction (i.e. from frame to frame). In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 2, the prediction macroblock can be subtracted from the current macroblock at stage 26 to produce a residual macroblock (residual). Transform stage 28 transforms the residual into transform coefficients in, for example, the frequency domain, and quantization stage 30 converts the transform coefficients into discrete quantum values, which are referred to as quantized transform coefficients or quantization levels. The quantized transform coefficients are then entropy encoded by entropy encoding stage 32. The entropy-encoded coefficients, together with the information required to decode the macroblock, such as the type of prediction used, motion vectors, and quantizer value, are then output to compressed bitstream 24.

The reconstruction path in FIG. 2 is present to ensure that both encoder 20 and a decoder 42 (described below) use the same reference frames to decode compressed bitstream 24. The reconstruction path performs functions similar to functions that take place during the decoding process that are discussed in more detail below, including dequantizing the quantized transform coefficients at dequantization stage 34 and inverse transforming the dequantized transform coefficients at inverse transform stage 36 in order to produce a derivative residual macroblock (derivative residual). At reconstruction stage 37, the prediction macroblock that was predicted at intra/inter prediction stage 26 can be added to the derivative residual to create a reconstructed macroblock. A loop filter 38 can then be applied to the reconstructed macroblock to reduce distortion such as blocking artifacts.

Video stream 10 is composed of a sequence of symbols, and entropy encoding stage 32 losslessly compresses this sequence of symbols. In a binary arithmetic coder, the symbols in the video stream 10 have either a value of 0 or a 1. For ease of the reader's understanding, the embodiments disclosed herein will be explained with reference to this binary arithmetic coder. However, the teachings set forth herein can be readily applied to other arithmetic coders capable of coding video streams with more than two symbols. Furthermore, embodiments of the present invention are not limited to coding video and may be applied to any other type of data (e.g. audio, text, etc.).

Other variations of encoder 20 can be used to encode compressed bitstream 24. For example, a non-transform based encoder can quantize the residual signal directly without transform stage 28. In another embodiment, an encoder may have quantization stage 30 and dequantization stage 34 combined into a single stage. The operation of encoding can be performed in many different ways and can produce a variety of encoded data formats. The above-described embodiments of encoding may illustrate some exemplary encoding techniques. However, in general, encoding is understood to mean any transformation of data from one form to another that may or may not include compression, reversibility, or loss of data.

Figure 3:
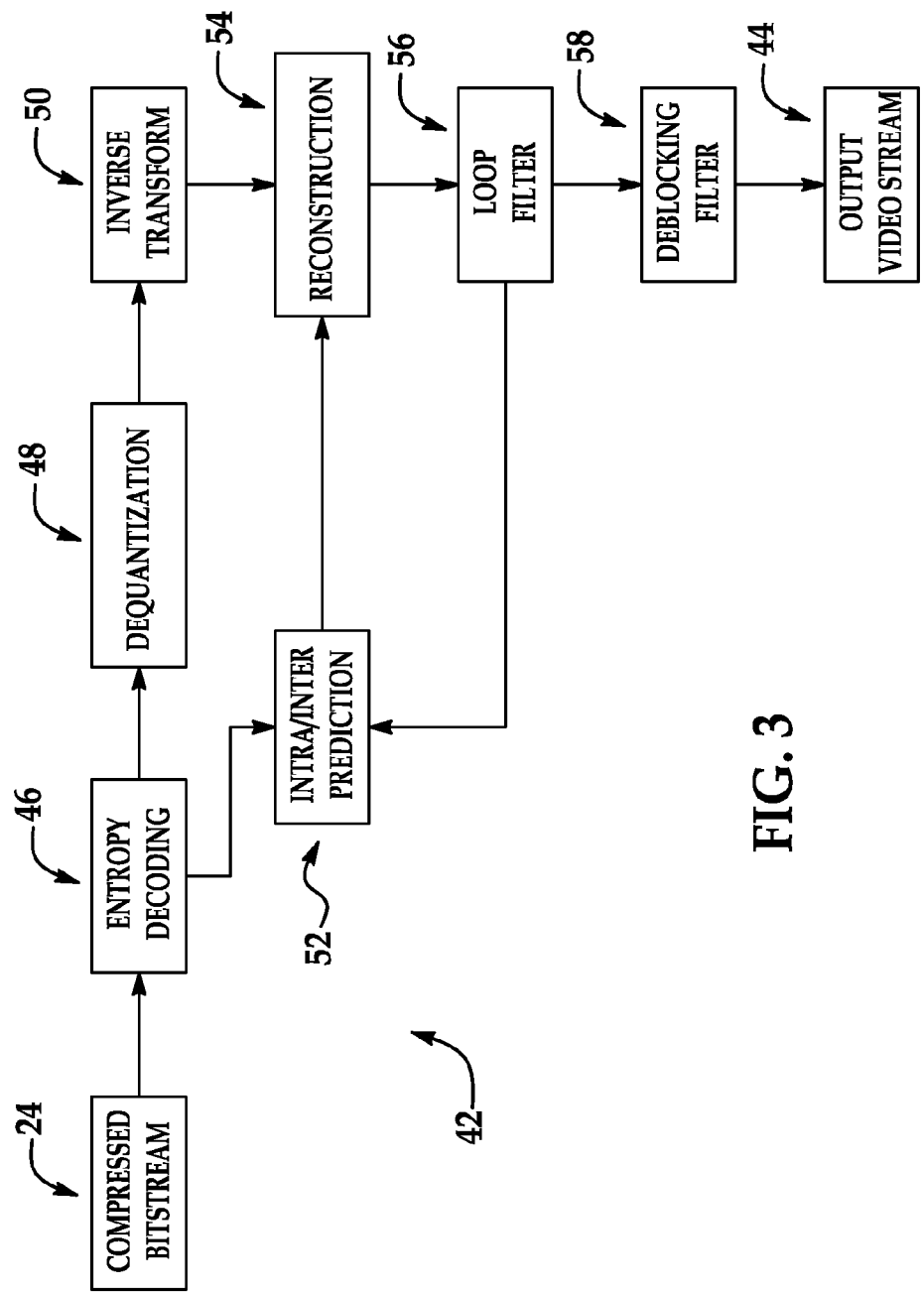
FIG. 3 is a block diagram of a video decompression system in accordance with one embodiment.

FIG. 3 is a block diagram of a video decompression system or decoder 42 to decode compressed bitstream 24. Decoder 42, similar to the reconstruction path of the encoder 20 discussed previously, includes the following stages to perform various functions to produce an output video stream 44 from compressed bitstream 24: an entropy decoding stage 46, a dequantization stage 48, an inverse transform stage 50, an intra/inter prediction stage 52, a reconstruction stage 54, a loop filter stage 56 and a deblocking filtering stage 58.

When compressed bitstream 24 is presented for decoding, the data elements within compressed bitstream 24 can be decoded by entropy decoding stage 46 (using, for example, Context Adaptive Binary Arithmetic Decoding) to produce a set of quantized transform coefficients. Dequantization stage 48 dequantizes the quantized transform coefficients, and inverse transform stage 50 inverse transforms the quantized transform coefficients to produce a derivative residual that can be identical to that created by the reconstruction stage in the encoder 20. Using header information decoded from the compressed bitstream 24, decoder 42 can use intra/inter prediction stage 52 to create the same prediction macroblock as was created in encoder 20. At the reconstruction stage 54, the prediction macroblock can be added to the derivative residual to create a reconstructed macroblock. The loop filter 56 can be applied to the reconstructed macroblock to reduce blocking artifacts. Deblocking filter 58 can be applied to the reconstructed macroblock to reduce blocking distortion, and the result is output as output video stream 44.

Other variations of decoder 42 can be used to decode compressed bitstream 24. For example, a decoder may produce output video stream 44 without deblocking filtering stage 58.

Currently, binary arithmetic encoders code successive 0 or 1 values by continuously sub-dividing an initial unit interval (i.e. a range) in the ratio of the relative probabilities that a zero or one value will occur. Video stream 10 (or some subset thereof) can thus, be represented by the binary expansion of a single number x with $0 \leq x < 1$. Further, each probability can be represented on a linear 8 bit-scale. Accordingly, zero can represent a probability of zero and 255 can represent a probability of one to give the interval $0 \leq x < 255$. The length of the interval, as will be discussed in more detail, is the range length. In one embodiment, x can be normalized to a value in a predetermined interval such as $128 \leq x < 255$. In other words, if x is less than 128, x can be normalized to be within the predetermined range. The normalization process will be discussed in additional detail below.

The encoding of each symbol restricts the possible values of x in proportion to the probability of what is encoded. At every stage, there is an interval $a \leq x < b$ of possible values of x. If p is the probability of a zero being coded at this stage and if a zero is coded, the interval becomes a≤x<a+(p·(b−a)). In this instance, a is the start value of the interval and a+(p·(b−a)) is the end value of the interval. Conversely, if a one is encoded, the interval becomes a+(p·(b−a))≤x<b. In this instance, a+(p·(b−a)) is the start value of the interval and b is the end value of the interval. After the encoder has received the last symbol to be coded in video stream 10, the binary arithmetic coder can write, as the output, any value of x that lies in the final interval. Alternatively, the binary arithmetic coder can output the final interval itself.

At each stage, the binary arithmetic encoder encodes one symbol at a time. In other words, the interval is restricted (or reduced) based on the probability of only the occurrence of the next symbol in the sequence of symbols. In contrast, embodiments of the present invention can encode and (as will be discussed in more detail below) decode a combination of symbols (i.e. a symbol set) simultaneously. Thus, for example, rather than encoder 20 restricting the interval based on the occurrence of a zero or a one, encoder 20 can restrict the interval based on the value 000.

To permit encoder 20 to encode multiple symbols at once, encoder 20 can pre-calculate the values for one or more variables (i.e. a pre-calculated range adjustment vector) used in the encoding process. These values can be calculated for all of the possible ranges in, for example, the interval 128≤x<255. These variables can be stored in a combination table 70 for use by the encoder during the encoding process. As will be discussed in more detail below, a similar table can be created and stored for use by the decoder during the decoding process. An exemplary combination table 70 is illustrated in FIG. 4 having a list of range lengths 72. For each of the range lengths 72, the combination table also includes a value N 74 representing a combination 76, an increment/decrement value 78, an adjustment length 80 and a count 82. During the encoding process, increment/decrement value 78 will be referred to as increment value 78 and during the decoding process (discussed below), increment/decrement value 78 will be referred to as decrement value 78.

Range length 72, as discussed previously, represents the difference between the end value and the start value in the interval. Thus, if the interval is 128≤x<255, there are, as illustrated, 128 possible values for the range.

N is the instance representing combination 76. In the example of FIG. 4, there is a total of eight combinations 76a-f. Accordingly, for each range, N can be a value from 0 to 7. In this example, each combination has three symbols. However, any number of symbols is possible. Furthermore, although every possible combination is shown in FIG. 4 of the exemplary combination table 70 for a 3-symbol combination, not every possible combination must be present in combination table 70. Thus, for example, another exemplary combination table 70 may only contain combination "000" and "011". Alternatively, in other embodiments, combination table 70 can include combinations having different numbers of symbols (i.e. two-symbol combinations and four-symbol combinations).

As discussed previously, once the range lengths 72 and combinations 76 are known, increment value 78, adjustment length 80 and count 82 can be pre-calculated so that they can be used during the encoding process. Rather than calculate the values to be used by encoder 20 at the time of encoding, the encoder 20 can use combination table 70 to find ("lookup") the values corresponding to each range length 72 and each combination 74. As will be discussed in more detail below, increment value 78 indicates the amount that the left endpoint (i.e. lower limit) of the interval should be increased by to give a new left endpoint. The sum of the new left endpoint and adjustment length 80 gives the new right endpoint of the interval. To calculate increment value 78 and adjustment length 80, the encoder 20 can perform the mathematical calculations required for all symbols in the combination 74 at once. The results from these mathematical calculations can then be stored in combination table 70.

As one example, the process for encoding a combination "001" can be processed by using the values of current range (range length 72), the probability of encoding a zero (Pzero/256) and the probability of encoding a one ((256− Pzero)/256). Assuming the value for encoding a zero and/or one does not change throughout the encoding process, the following calculations can be performed by encoder 20:

P0=Pzero/256;
Split0=P0*RangeLength0;
RangeLength1=Split0;
P1=Pzero/256;
Split1=P1*RangeLength1;
RangeLength2=Split1;
P2=(256− Pzero)/256;
Split2=P2*RangeLength2;
RangeLength3=RangeLength2− Split2;

P0 is the probability of encoding first symbol as zero;
P1 is the probability of encoding second symbol as zero;
P2 is the probability of encoding third symbol as one;
Split0 is a value used to determine the lower and upper limits for encoding the first symbol and is used to encode the second symbol in the combination;
Split1 is a value used to determine the lower and upper limits for encoding the second symbol and is used to encode the third symbol in the combination;
Split2 is a value used to determine the lower and upper limits for encoding the third symbol.
RangeLength0 is the initial range;
RangeLength1 is the range after encoding the first symbol;
RangeLength2 is the range after encoding the second symbol; and
RangeLength3 is the range after encoding the third symbol.

Accordingly, RangeLength3 can be the value of the adjustment length 80 associated with a combination of "001" and a range length of RangeLength0. Increment value 78 can be calculated by, for example, adding the split values (e.g. Split2) associated with symbols having a value of one. In our example, above, only the third symbol has a value of one. Thus, the value of the increment value 78 associated with a combination of "001" and a range length of RangeLength0 is Split2.

Thus, the value of the lower (i.e. NewLow) and the upper (i.e. NewHigh) limits of the new range after encoding are the following:

NewLow=OldLow+IncrementValue;

wherein
IncrementValue is increment value 78, which is associated with a particular range length 72 and combination 76.

NewHigh=NewLow+RangeLength;

wherein
RangeLength is adjustment length 80 which is associated with a particular range length 72 and combination 76.

Further, so that these calculations are reasonably accurate when encoded, encoder 20 can prevent the adjustment length 80 from falling below a certain value (e.g. 128). Accordingly, the encoder can normalize the value of the range so it is within a predetermined interval (e.g. 128≤x<255). To normalize, for example, encoder 20 can double the NewLow and/or RangeLength. The process can be repeated until the NewLow and/or RangeLength falls within the predetermined interval. Count 82 can indicate when bits should be written to or read from encoder 20 or decoder 42, respectively.

Combination table 70 can include other suitable values in lieu of or in addition to range length 72, value N 74, combination 76, increment value 78, adjustment length 80 and count 82. For example, rather than incrementing the lower limit, the upper limit of the current range can be decremented to determine a new upper limit. In turn, range length 72 can be used in conjunction with this new upper limit to find a new lower limit.

Further, although the embodiments discussed previously describe indexing into combination table 70 using two index values (i.e. range length 72 and value N 74), any number of values can be used, including one. For example, a single index value may be generated from range length 72 and value N 74 using a predetermined algorithm. The index value may also be a concatenation of range length 72 and value N 74. Other techniques of indexing into combination table 70 are also available.

Figure 5:
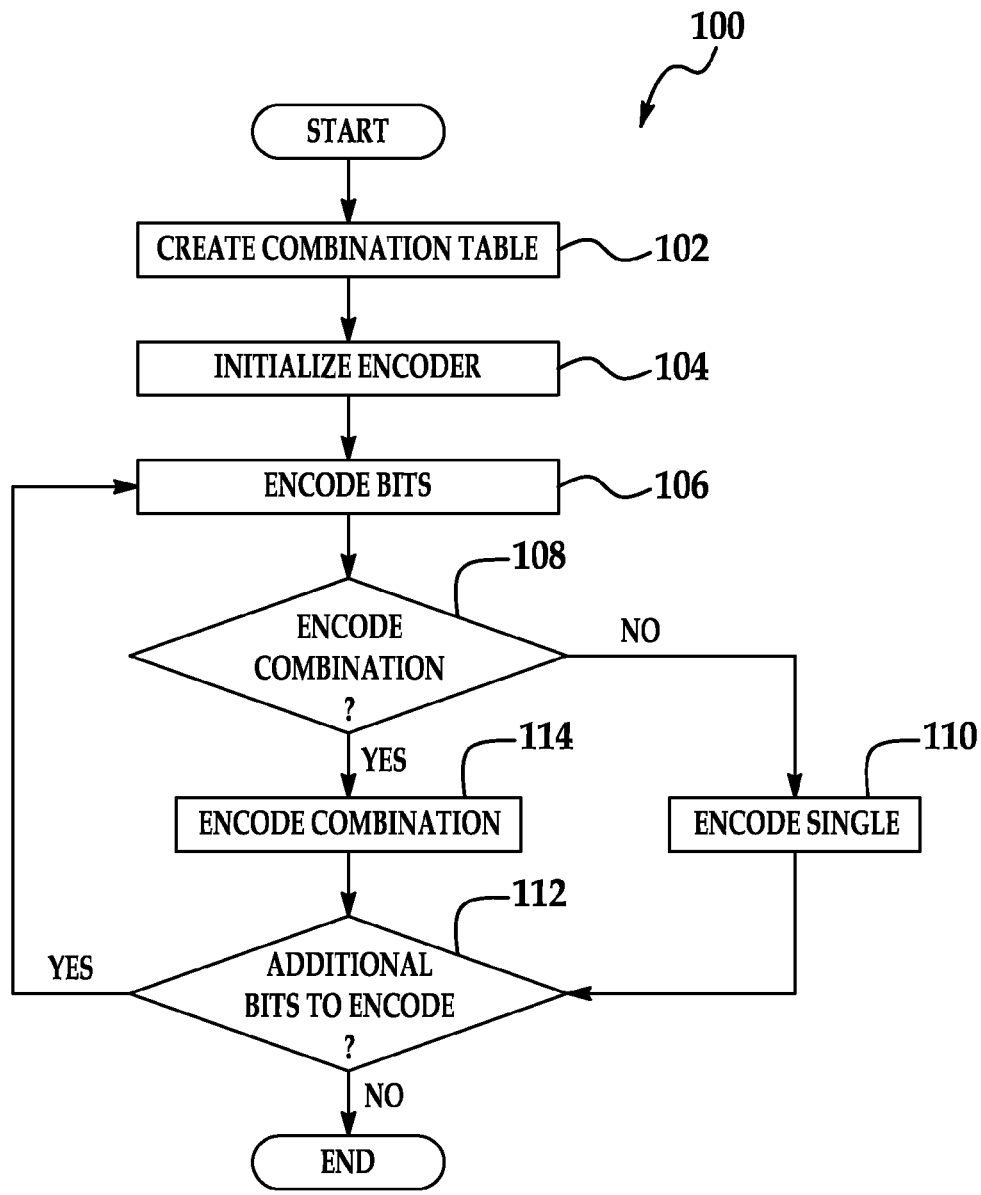
FIG. 5 is a flowchart diagram of an exemplary method of encoding in the video compression system of FIG. 2.

Referring to FIG. 5, a flowchart diagram presents one exemplary routine 100 for encoding in the entropy encoding stage 32. First, a combination table 70 is created (102). As discussed previously, the combination table 70 can provide encoder 20 with the pre-calculated range adjustment vectors for each range 72 and combination 74. The details of creating the combination table 70 will be described in additional detail hereafter with respect to FIG. 6. Alternatively, the combination table 70 can be created and/or received from a source external to the encoder 20 (e.g. software preprocessing stage). After the combination table 70 is created, the encoder 20 is initialized (104). Initializing encoder 20 can include setting variables and/or conditions to predetermined values before the start of the encoding process.

After encoder 20 has been initialized, the encoder 20 starts to encode bits (i.e. symbols) into the compressed bitstream 24 (106). The encoder first determines if the bits to be encoded are a combination as specified in the combination table (108).

If the bits to be encoded are not a combination, the encoder 20 encodes a single bit (110). Details of encoding a single bit will be described in additional detail hereafter with respect to FIG. 7.

If the bits to be encoded are a combination, the encoder 20 encodes the combination (114). Details of encoding combinations will be described in additional detail hereafter with respect to FIG. 8.

After the single bit has been encoded (110) or combination has been encoded (114), the encoder 20 determines if there are additional bits to encode (112). If there are additional bits to encode, the encoder 20 returns to encode bits (106). Otherwise, the routine 100 ends.

Figure 6:
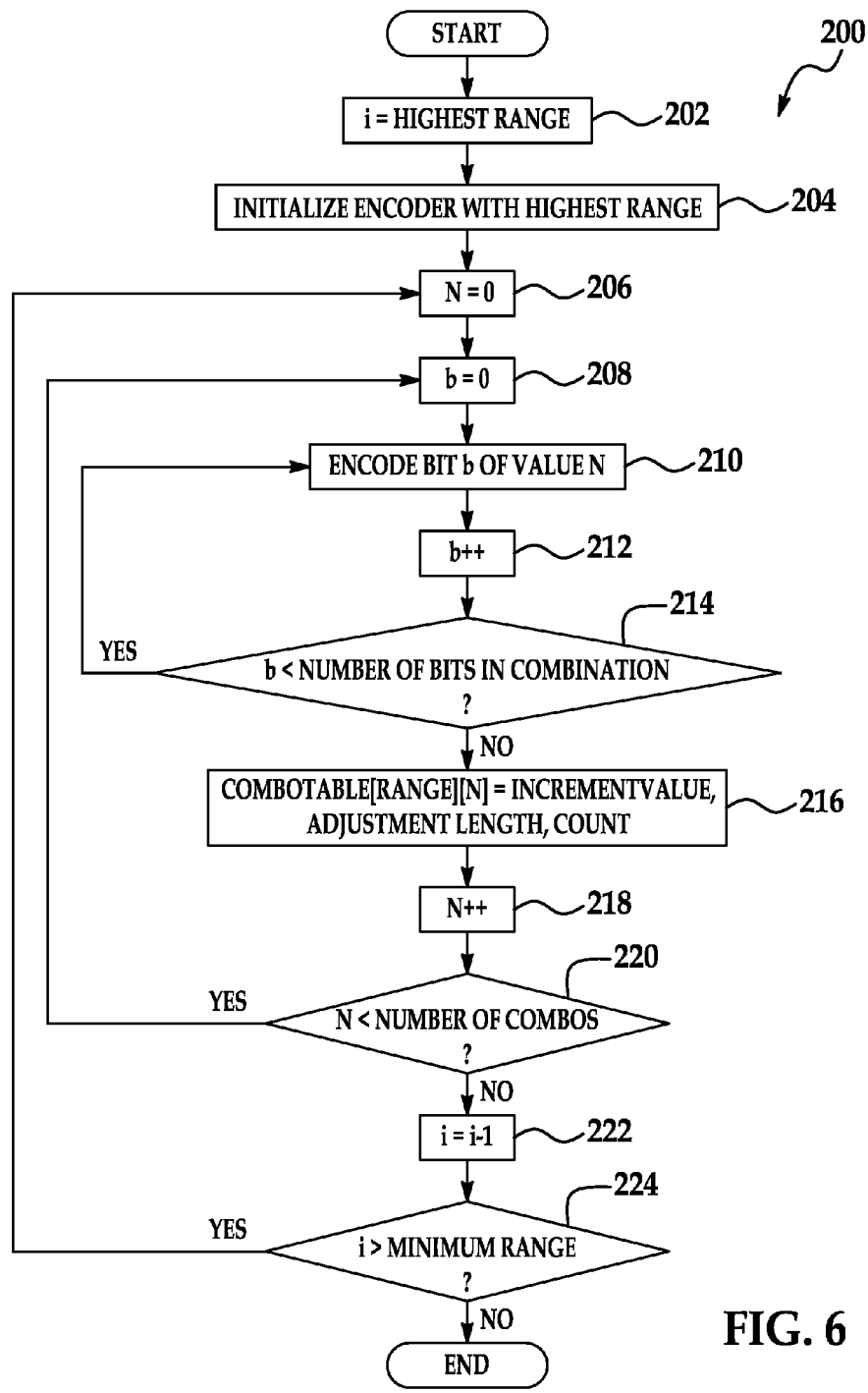
FIG. 6 is a flowchart diagram of an exemplary method of creating the combination table of FIG. 4 in the video compression system of FIG. 2.

Referring to FIG. 6, a flowchart diagram presents one suitable routine 200 for creating combination table 70 as described previously with respect to step 102 shown in FIG. 5. First, a variable i is initialized to the highest range on the probability scale (202). Variable i represents the value of the range lengths 72, which can be, for example, a value from 128 to 255. Thus, the highest range can be set to 255. Other suitable values are available. Encoder 20 is then initialized with the highest range (204). Value N 74 is then set to zero (206). Bit b is then set to 0 (208). Bit b represents the specific instance of the bit currently being encoded in the combination.

Bit b of the combination is then encoded in order to pre-calculate the values associated with that combination for populating combination table 70 (e.g. increment value 78, adjustment value 80 and/or count 82). Bit b is then incremented (212). After bit b is incremented, the encoder 20 determines whether bit b has exceeded the number of the bits in the combination (214). If b has not exceeded the number of bits in the combination, the next bit b of value N is encoded (210). The process is repeated until all of the bits have been encoded in the combination. Once all of the bits have been encoded, the final values of increment value 78, adjustment value 80 and a count 82 will have been determined for that specific combination and range.

If b has exceeded the number of bits in the combination, encoder 20 populates the combination table with the values for the current range (i) and value N that based on the resulting values determined during the encoding of the combination (216). Then variable N is incremented (218). Encoder 20 then determines if there are additional combinations to be encoded for the current range i (220). If there are additional combinations to be encoded for this specific range, the process described above is repeated (208). If there are no additional combinations to be encoded for this specific range, variable i is decrement to decrease the current range (222). Encoder 20 then determines if variable i is greater than the minimum range (224). If i does not exceed the minimum range (e.g. 128), encoder 20 populates the values for all combinations in the next range in the combination table (206). Otherwise if variable i exceeds the minimum range, the process ends and combination table 70 is fully populated.

Figure 7:
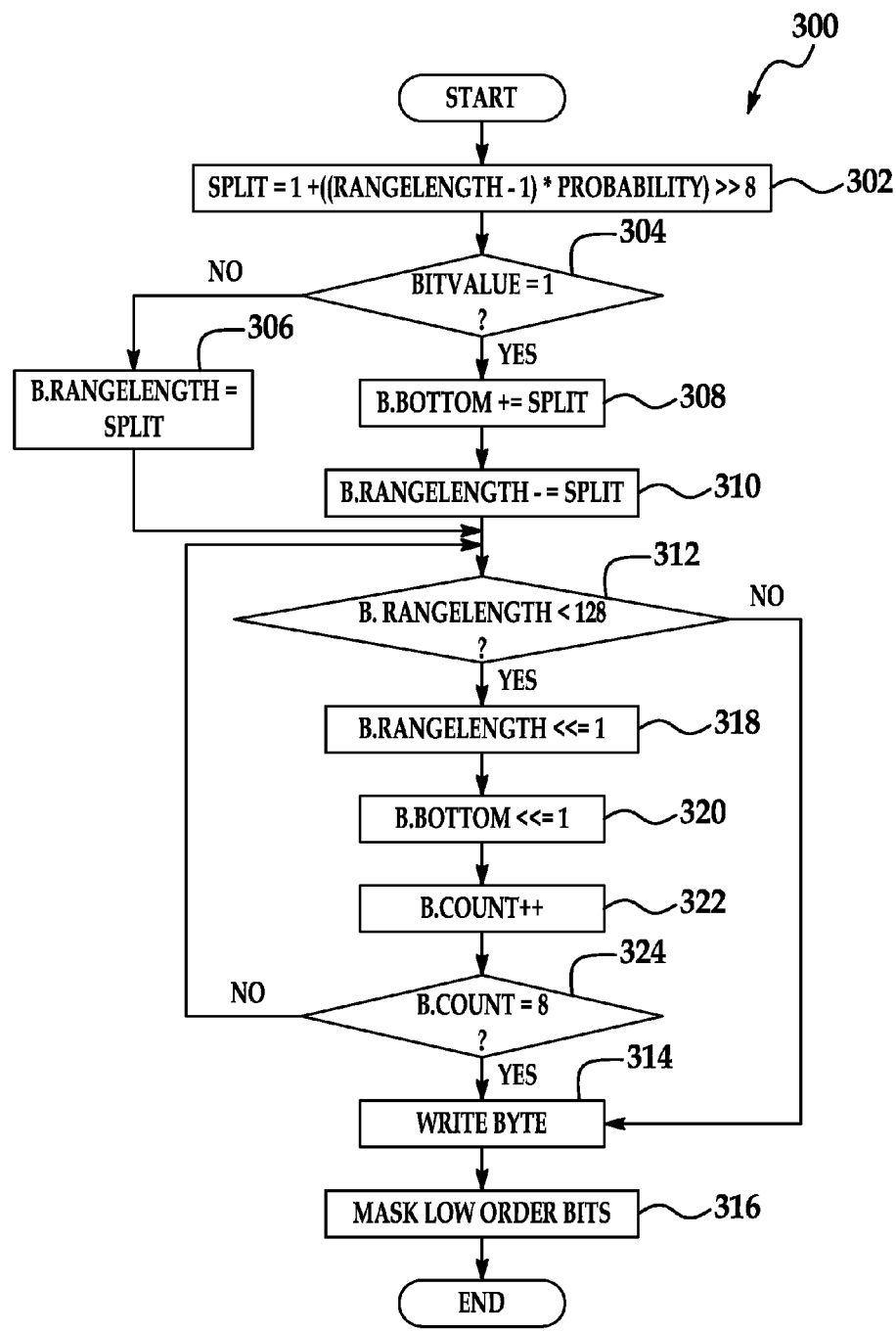
FIG. 7 is a flowchart diagram of an exemplary method of encoding a single symbol in the video compression system of FIG. 2.

Referring to FIG. 7, a flowchart diagram presents an exemplary routine 300 for encoding a single symbol as described previously with respect to step 110 shown in FIG. 5. First, a split value "Split" is calculated based on the range length (i.e. the current range) multiplied by the probability for the symbol being encoded (302). More specifically, in one embodiment, Split can be calculated using the following equation:

$$\text{Split}=1+((\text{RangeLength}-1)*\text{Probability})\gg 8.$$

The encoder 20 then determines if the symbol being encoded is equal to one (304). If the symbol being encoded is equal to zero, the encoder 20 sets the current range for the bitstream "B.RangeLength" equal to the split value (306). In this case, the current low limit value "B.Bottom" remains unchanged. However, if the symbol being encoded is a one, the encoder 20 first adds the split value to B.Bottom (308). The encoder then subtracts the split value from B.RangeLength (310).

From step 306 or step 310 depending on whether the value being encoded is a zero or a one, respectively, encoder 20 then determines whether B.RangeLength is less than 128 (312). When B.RangeLength is greater than or equal to 128, encoder 20 first writes a byte to the bitstream (314). Encoder 20 then masks the low order bits (316). In other words, neither B.RangeLength nor B.Bottom are normalized.

However, when B. RangeLength is less than 128, B. RangeLength and B.Bottom can be normalized. First, encoder 20 will left-shift B. RangeLength by one bit (i.e. multiply B.RangeLength by 2) (318). Then, encoder 20 will left-shift B.Bottom by one bit (i.e. multiply B.Bottom by 2) (320). Normalization permits the encoder 20 to maintain the accuracy and precision of the values of B.RangeLength and B.Bottom. Encoder 20 then will increment the count (B.Count) for the symbol (322). Encoder 20 then determines whether B.Count is equal to 8 (324). If B.Count is not equal to 8, the encoder repeats the process starting at step 312. If B.Count is equal to 8, encoder 20 then writes a byte to the bitstream (314). Encoder 20 then masks the low order bits (316).

Figure 8:
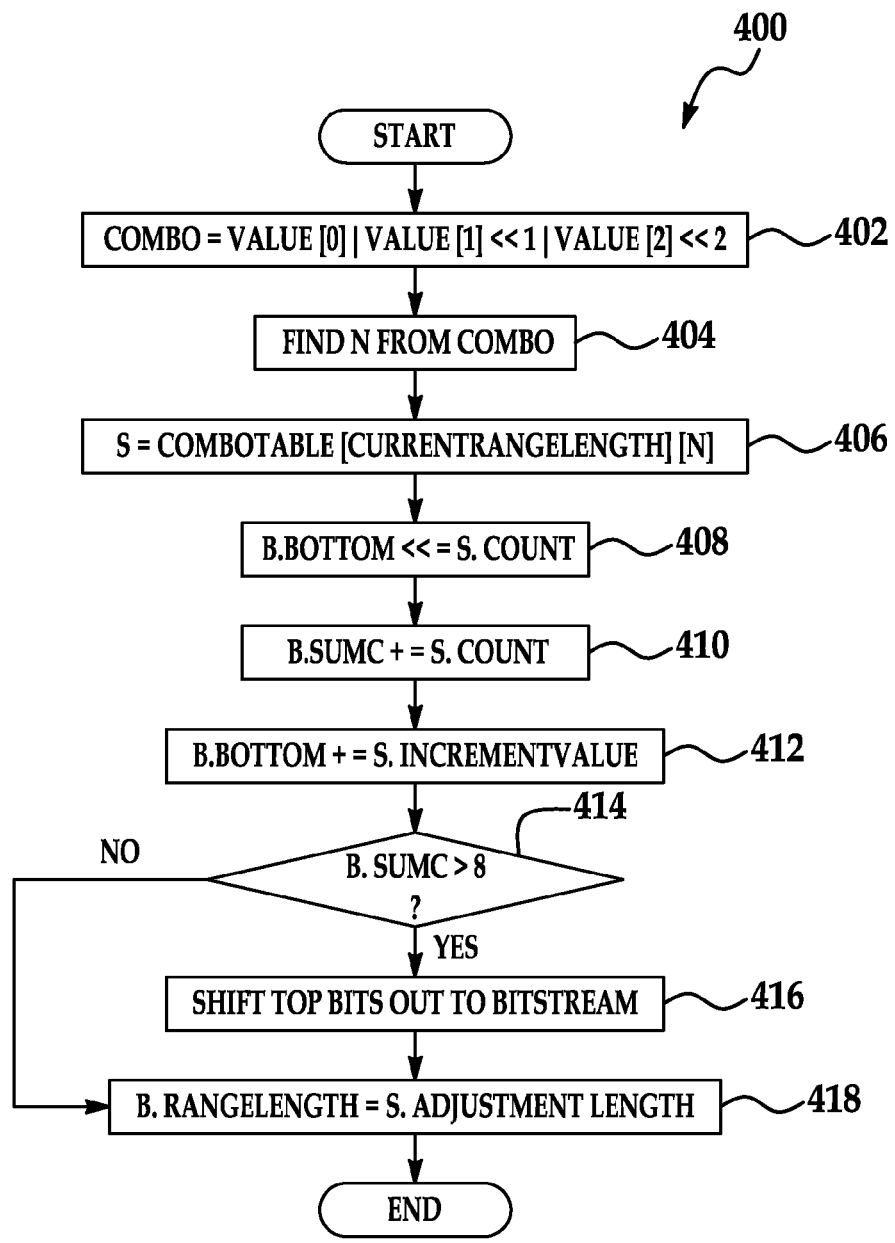
FIG. 8 is a flowchart diagram of an exemplary method of encoding a combination of symbols in the video compression system of FIG. 2.

Referring to FIG. 8, a flowchart diagram presents an exemplary routine 400 for encoding a combination 76 as described at step 114 shown in FIG. 5. First (after a combination 76 has been detected), the encoder 20 extracts the values for each symbol from the bitstream to be encoded and combined to form "Combo" (402). The encoder 20 then determines value N 74 from combo (404). Value N 74 can be used, as discussed previously, to determine the pre-calculated range adjustment vector in combination table 70. Encoder 20 then sets the pre-calculated range adjustment vector equal to S based on the current range length 72 and the value N 74 in combination table 70 (406). As discussed previously, the pre-calculated range adjustment vector can include increment value 78, range length adjustment value 80, and count 82, which can be denoted as S.IncrementValue, S.AdjustmentLength and S.Count, respectively. Encoder 20 then normalizes the current low limit value B.Bottom according to the value of count S.Count (408). Encoder 20 then adds S.Count to a total count value B.SumC (410). B.SumC can indicate when bits should be written to the bitstream.

Encoder 20 then can add S.IncrementValue to B.Bottom (412). Encoder 20 then determines whether B.SumC is greater than 8 (414). If B.SumC is greater than 8, encoder 20 shifts the top bits out to the compressed bitstream 24 (416). If B.SumC is not greater than 8, no bits are shifted out to the compressed bitstream 24. Encoder 20 then sets the current range length equal to the S.AdjustmentLength (418).

Figure 9:
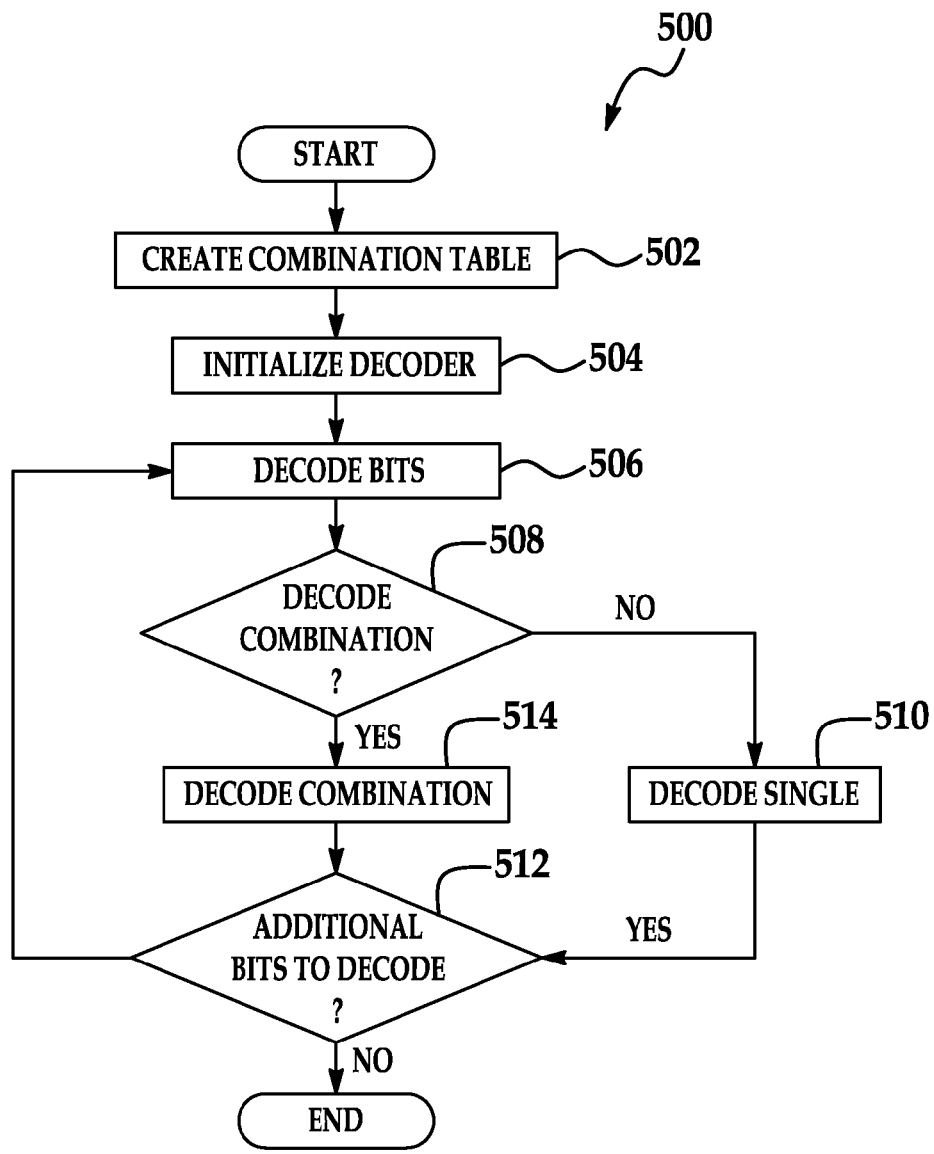
FIG. 9 is a flowchart diagram of an exemplary method of decoding in the video decompression system of FIG. 3.

Referring to FIG. 9, a flowchart diagram presents an exemplary routine 500 for decoding in the entropy decoding stage 46 in decoder 42. The decoder 42 first creates a combination table 70 (502). The combination table 70 created by decoder 42 includes the same values as the corresponding combination table 70 created by encoder 20. Alternatively, in other embodiments, rather than the decoder 42 creating the combination table 70, it can be encoded in the compressed bitstream 24 as generated by the encoder 24 or an external source. Like the combination table 70 of the encoder 20, the combination table 70 generated by the decoder 42 can provide the pre-calculated range adjustment vectors for each range 72 and combination 74.

The decoder 42 is then initialized (504). Initializing the decoder can include setting variables and/or conditions to predetermined values before the start of the decoding process.

After the decoder 42 is initialized, decoder 42 decodes bits (i.e. symbols) from the compressed bitstream 24 (506). Decoder 42 then determines if the bits to be decoded are a combination as specified in the combination table 70 (508). If the bits to be decoded are not a combination, decoder 42 decodes a single bit (510). Details of decoding a single bit will be described in additional detail hereafter with respect to FIG. 11. After a single bit has been decoded, decoder 42 determines if there are additional bits to decode (512). If there are additional bits to decode, decoder 42 returns to step 506. Otherwise, the routine 500 ends.

Returning to step 508, if the bits to be decoded are a combination, decoder 42 decodes the combination (514). Details of decoding combinations will be described in additional detail hereafter with respect to FIG. 12. After the combination 76 has been decoded, decoder 42 determines if there are additional bits to decode (512). If there are additional bits to decode, decoder 42 returns to step 506. Otherwise, the routine 500 ends.

Figure 10:
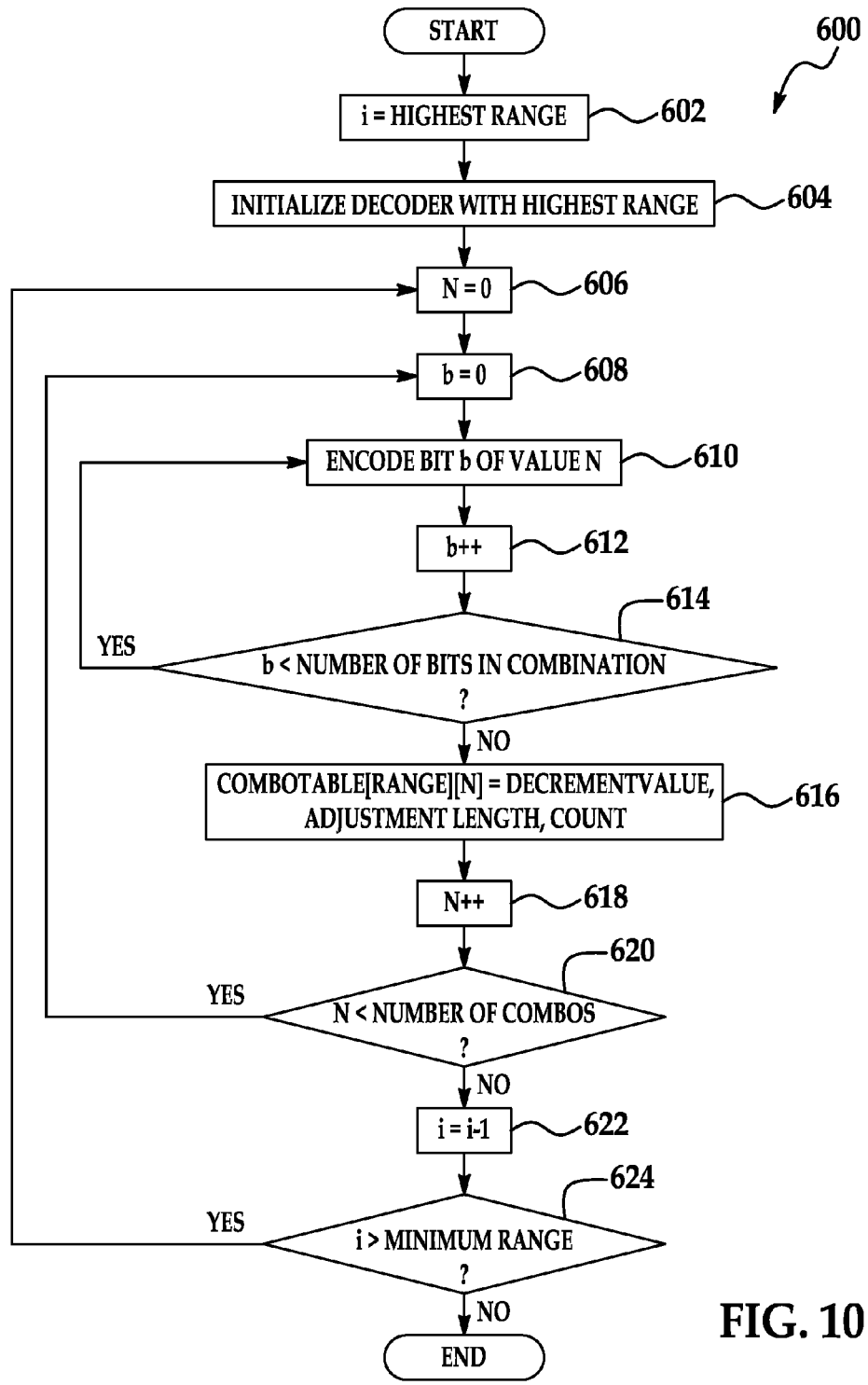
FIG. 10 is a flowchart diagram of an exemplary method of creating the combination table of FIG. 4 in the video decompression system of FIG. 3.

Referring to FIG. 10, a flowchart diagram presents an exemplary routine 600 for creating a combination table 70 for use in the decoder 42 as described previously with respect to step 502 as shown in FIG. 9 (502). The decoder 42 first initializes a variable i to the highest range on a probability scale (602). Variable i represents the value of the range lengths 72, which can be, for example, a value from 128 to 255. Thus the highest range can be set to 255. Other suitable values are available. Decoder 42 then initializes with the highest range (604). Value N 74 is then set to zero (606). Bit b is then set to 0 (608). Variable b can represent the specific instance of the bit being decided in the combination.

Then, decoder 42 encodes bit b of the combination in order to pre-calculate the values associated with that combination for populating combination table 70 such as decrement value 78, adjustment value 80 and/or count 82 (610). Decoder 42 then increments variable b (612). After bit b is incremented, decoder 42 determines whether variable b has exceeded the number of the bits in the combination (614). If b has not exceeded the number of bits in the combination, decoder 42 encodes the next bit b of value N (610). The process is repeated until all of the bits have been encoded in the combination. Once all of the bits have been encoded, the final values of decrement value 78, adjustment value 80 and a count 82 will have been determined for that specific combination and range.

If b has exceeded the number of bits in the combination, decoder 42 populates the combination table 70 with the values for the current range (i) and value N that based on the resulting values determined during the encoding of the combination (610). Decoder 42 then increments increment N (618). Decoder 42 then determines if there are additional combinations to be encoded for the current range i (620). If there are additional combinations to be encoded for this specific range, decoder 42 returns to step 608 to repeat the process. If there are no additional combinations to be encoded for this specific range, decoder 42 decrement i to decrease the current range (622). Decoder 42 then determines if i is greater than the minimum range (624). If i exceeds the minimum range (e.g. 128), decoder 42 returns to step 606 to populate the values for all combinations in the next range in the combination table. Otherwise, if i does not exceed the minimum range, the process ends and combination table 70 is fully populated.

Figure 11:
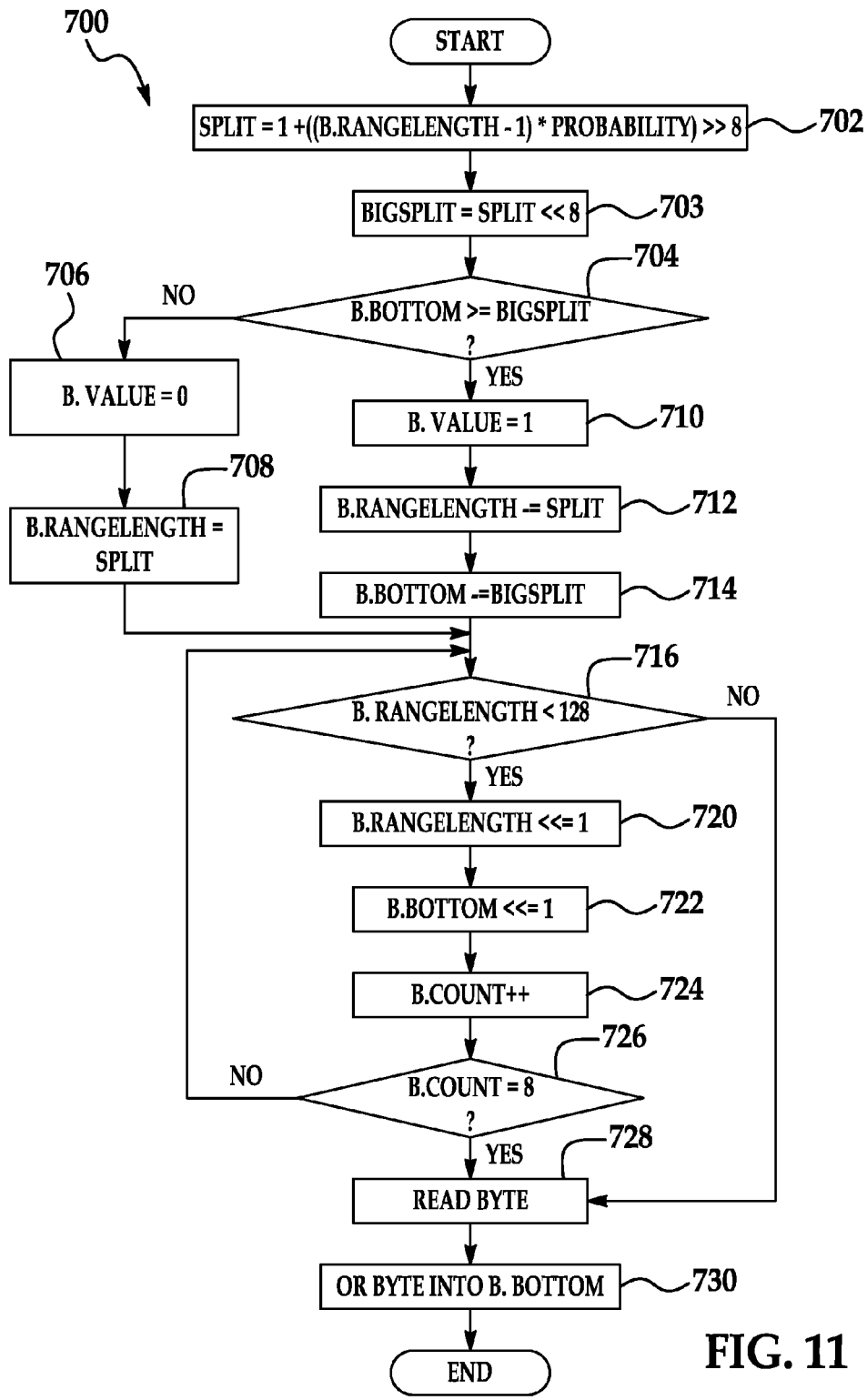
FIG. 11 is a flowchart diagram of an exemplary method of decoding a single symbol in the video decompression system of FIG. 3.

Referring to FIG. 11, a flowchart diagram presents an exemplary routine 700 for decoding a single symbol as described previously with respect to step 510 shown in FIG. 9. Decoder 42 first calculates a split value "Split" based on the range length 72 "B.RangeLength" (i.e. the current range) multiplied by the probability for the symbol being decoded (702). Decoder 42 then calculates another split value "BigSplit" from the Split (703). Specifically, BigSplit can be calculated by multiplying Split by 256 (i.e. shifting Split 8 bits to the left). Decoder 42 then determines if bits extracted from the compressed bitstream 24 (stored in a variable "B.Bottom") are greater than or equal to BigSplit (704). The number of bits that are extracted can be of any suitable size. For example, 32 bits can be extracted from the encoded bitstream at a time (i.e. 4 bytes).

If B.Bottom is less than BigSplit, decoder 42 sets the value of the decoded bit "B.Value" equal to zero (706). Decoder 42 then sets the current range for the bitstream B.RangeLength equal to Split (708). In this case, the current low limit value "B.Bottom" remains unchanged.

However, if B.Bottom is greater than or equal to BigSplit, the decoder 42 sets the value of the decoded bit "B.Value" equal to one (710). Decoder 42 then subtracts Split from B.RangeLength (712). Decoder 42 then subtracts BigSplit from B.Bottom (714).

From step 708 or step 714 depending on whether the value being decoded is a zero or a one, respectively, decoder 42 then determines whether B.RangeLength is less than 128 (716). When B.RangeLength is greater than or equal to 128, the routine 700 ends. In other words, no bits are read from the compressed bitstream 24 and neither B.RangeLength nor B.Bottom is normalized.

When B.RangeLength is less than 128, B. RangeLength and B.Bottom can undergo normalization. Specifically, decoder 42 left-shifts B.RangeLength by one bit (i.e. multiplies B.RangeLength by 2) (720), and left-shifts B.Bottom by one bit (i.e. multiplies B.Bottom by 2) (722). Decoder 42 then increments B.Count for the symbol (724). Decoder 42 then determines whether B.Count is equal to 8 (726). If B.Count is not equal to 8, decoder 42 returns to step 716. If B.Count is equal to 8, control reads a byte from compressed bitstream 24 (728). A byte can then be "ORed" into B.Bottom (730). The routine 700 then ends.

Figure 12A:
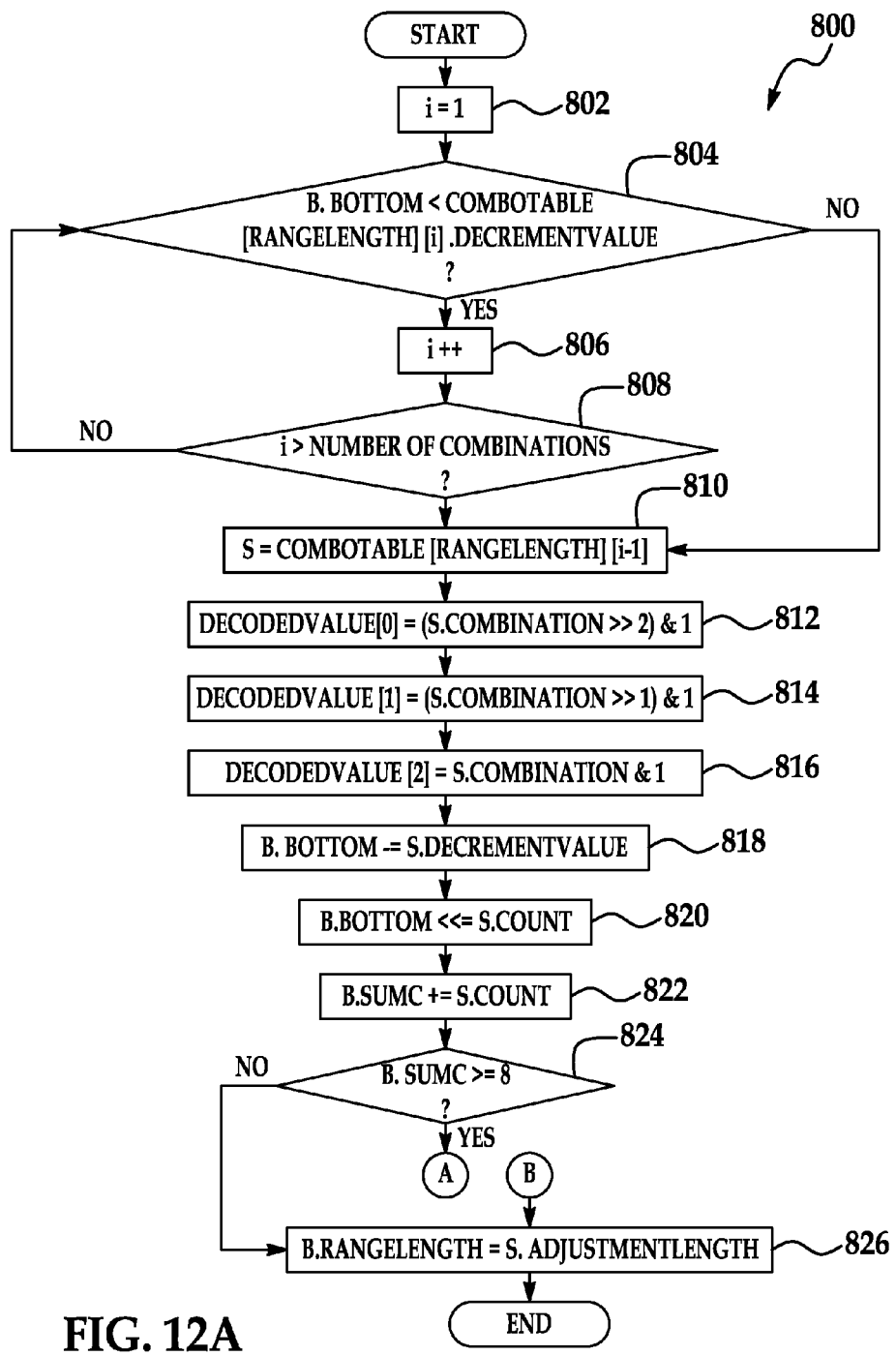
FIGS. 12A and 12B are flowchart diagrams of an exemplary method of decoding a combination of symbols in the video decompression system of FIG. 3.
Figure 12B:
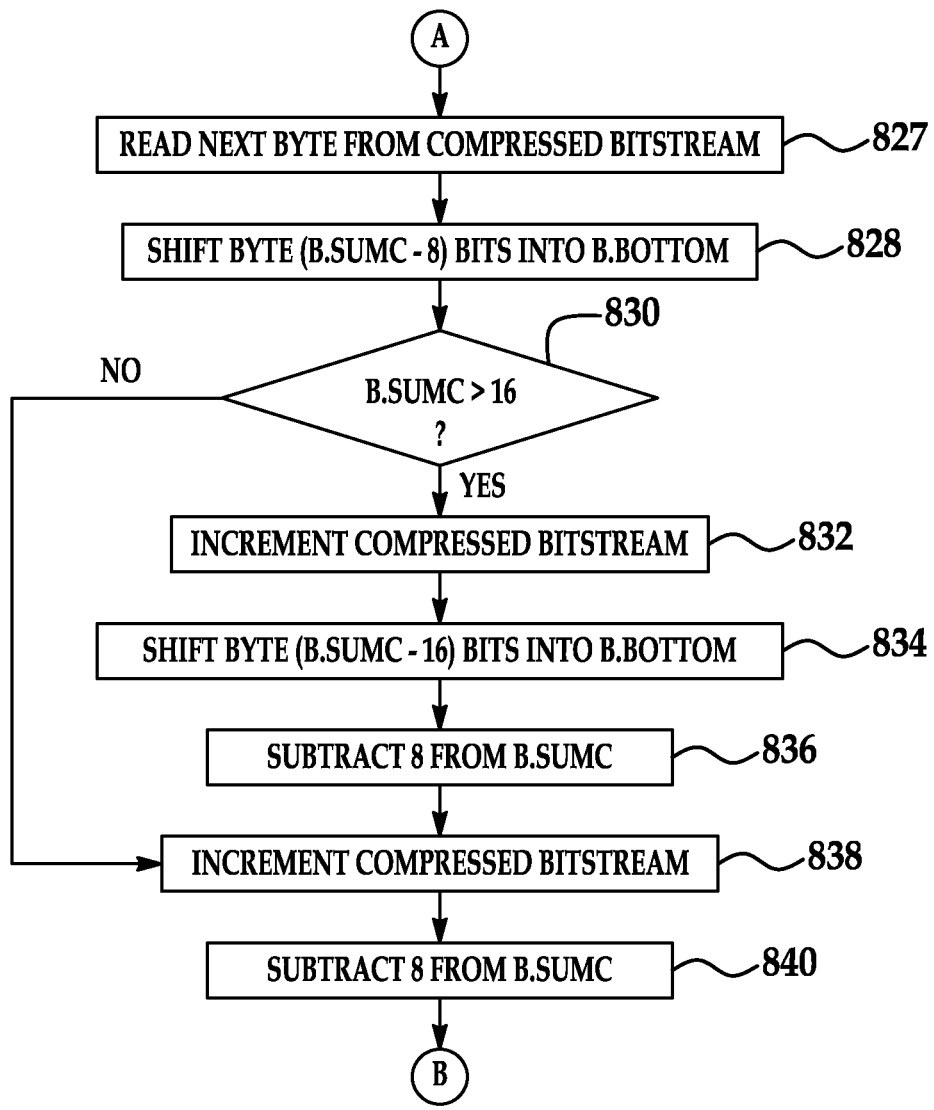

Referring to FIGS. 12A and 12B, a flowchart diagram presents an exemplary routine 800 for decoding a combination 76 as described previously with respect to step 514 shown in FIG. 9. Decoder 42 first initializes variable "i" to a value of one. In this routine, variable i can represent the specific instance of the combination 76 currently being examined in the combination table 70. Decoder 42 then determines if bits extracted from the compressed bitstream 24 (stored in a variable "B.Bottom") are less than the decrement value 78 retrieved from the combination table 70 (for the current range length "CurrentRangeLength" and current value of i (804).

If B.Bottom is less than the decrement value, decoder 42 increments i (806). Decoder 42 then determines whether i is greater than the number of combinations in the combination table 70 (808). If i is not greater than the number of combinations 76, decoder 42 returns to step 804 to examine the next decrement value in the combination table 70 for the current range length 72. Each of the decrement values 78 (for each range length 72) can be sorted in descending order such that a comparison can be made beginning with the lowest value.

However, if B.Bottom is greater than or equal to the decrement value, a combination 76 has been found or if i is greater than the number of combinations, decoder 42 extracts the values from the combination table 70 (based on current range length 72 and the value i) and sets the values equal to S (810). The values extracted can include the current range length 72, value N 74, combination 76, decrement value 78, adjustment length 80 and count 82.

Decoder 42 then extracts the first bit in the combination 76 as the first value decoded (812). Decoder 42 then extracts the second bit in the combination 76 as the second value decoded (814). Decoder 42 then extracts the third bit in the combination as the third value decoded (816). All three of these values are stored in "DecodedValue." Thus, for example, if the combination was "011," the '0' is stored in DecodedValue[0], the first '1' is stored in DecodedValue[1] and the second '1' is stored in Decoded Value[2]. Other suitable techniques for extracting and storing the decoded values are also available. Further, this routine is exemplary and is described with reference to combination 76 having three bits. However, as discussed previously, combination 76 may have any number of bits and the routine may be modified to appropriately extract the appropriate number of bits.

After the combination 76 is decoded by decoder 42, decoder 42 subtracts S.DecrementValue from B.Bottom (818). Decoder 42 then normalizes the current low limit value B.Bottom according to the value of count S.Count (820). Decoder 42 then adds S.Count to a total count value B.SumC (822). As discussed previously, B.SumC can indicate when bits should be written to the output video stream 44.

Decoder 42 then determines whether B.SumC is greater or equal to 8 (824). If B.SumC is less than 8, decoder 42 sets the B.RangeLength equal to S.AdjustmentLength (826). The routine 800 then ends.

However, if B.SumC is greater than or equal to 8, decoder 42 reads the next byte from the compressed bitstream 24 (827) and shifts byte (B.SumC minus 8) bits into B.Bottom (in FIG. 12B). Decoder then determines whether B.SumC is greater than 16 (830).

If B.SumC is greater than 16, decoder 42 first increments the compressed bitstream 24 (832). Decoder 42 then shifts a byte (B.SumC—16) into B.Bottom (834) subtracts 8 from B.SumC (836). Subsequently, or if decoder 42 determines that B.SumC is not greater than 16 at step 830), decoder 42 increments compressed bitstream 24 (838) and subtracts 8 from B.SumC (840). Decoder 42 then (returning to FIG. 12A) sets the B.RangeLength equal to S.AdjustmentLength (826). The routine 800 then ends.

The above-described embodiments of encoding or decoding may illustrate some exemplary encoding techniques. However, in general, encoding and decoding as those terms are used in the claims are understood to mean compression, decompression, transformation or any other change to data whatsoever.

Encoder 20 and/or decoder 42 are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any the foregoing, either singly or in combination. The terms "signal" and "data" are used interchangeably.

Encoder 20 and/or decoder 42 also include a memory, which can be connected to the processor through, for example, a memory bus. The memory may be read only memory or random access memory (RAM) although any other type of storage device can be used. Generally, the processor receives program instructions and data from the memory, which can be used by the processor for performing the instructions. The memory can be in the same unit as the processor or located in a separate unit that is coupled to the processor.

For example, encoder 20 can be implemented using a general purpose processor with a computer program that, when executed, carries out any of the respective methods, algorithms and/or instructions described herein. In addition or alternatively, for example, a special purpose processor can be utilized which can contain specialized hardware for carrying out any of the methods, algorithms and/or instructions described herein. Portions of encoder 20 or decoder 42 do not necessarily have to be implemented in the same manner. Thus, for example, intra/inter prediction stage 26 can be implemented in software whereas transform stage 28 can be implemented in hardware. Portions of encoder 20 or portions of decoder 42 may also be distributed across multiple processors on the same machine or different machines or across a network such as a local area network, wide area network or the Internet.

Encoder 20 and decoder 42 can, for example, be implemented in a wide variety of configurations, including for example on servers in a video conference system. Alternatively, encoder 20 can be implemented on a server and decoder 42 can be implemented on a device separate from the server, such as a hand-held communications device such as a cell phone. In this instance, encoder 20 can compress content and transmit the compressed content to the communications device, using the Internet for example. In turn, the communications device can decode the content for playback. Alternatively, the communications device can decode content stored locally on the device (i.e. no transmission is necessary). Other suitable encoders and/or decoders are available. For example, decoder 42 can be on a personal computer rather than a portable communications device.

The operations of encoder 20 or decoder 42 (and the algorithms, methods, instructions etc. stored thereon and/or executed thereby) can be realized in hardware, software or any combination thereof. All or a portion of embodiments of the present invention can take the form of a computer program product accessible from, for example, a computer-usable or computer-readable medium. A computer-usable or computer-readable medium can be any device that can, for example tangibly contain, store, communicate, and/or transport the program for use by or in connection with any processor. The medium can be, for example, an electronic, magnetic, optical, electromagnetic, or a semiconductor device. Other suitable mediums are also available.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A method for encoding data by determining a range, wherein the data includes a sequence of symbols each associated with a probability of occurrence, and the range is indicative of the encoded data, comprising:
   identifying a current symbol set from the sequence of symbols, wherein the current symbol set includes an ordered combination of at least two of the symbols;
   selecting, by a processor, a pre-calculated range adjustment vector from an indexed list of a plurality of pre-calculated range adjustment vectors; wherein within the indexed list:
      each pre-calculated range adjustment vector is identified with a respective symbol set of a plurality of symbol sets and an initial range of a plurality of initial ranges;
      each symbol set of the plurality of symbol sets is formed of at least two of the symbols arranged in a defined order;
      each initial range is respectively combined with at least two symbol sets of the plurality of symbol sets; and
      each pre-calculated range adjustment vector defines a change to at least one of an initial lower limit or an initial upper limit of a current range; and wherein:
   selecting the pre-calculated range adjustment vector from the indexed list includes comparing the current symbol set and the current range to entries within the indexed list to select the pre-calculated range adjustment vector;
   generating an adjusted range from the current range using the selected pre-calculated range adjustment vector; and
   encoding the current symbol set based on the adjusted range.

2. The method of claim 1, wherein:
   the selected pre-calculated adjustment vector includes an adjustment length and an increment value; and
   generating the adjusted range includes setting a lower limit of the adjusted range to a sum of the initial lower limit of the current range and the increment value and setting an upper limit of the adjusted range to a sum of the lower limit of the adjusted range and the adjustment length.

3. The method of claim 1, wherein comparing the current symbol set and the current range to entries within the indexed list to select the pre-calculated range adjustment vector includes:
   determining an index based on the current symbol set and a length of the current range; and
   selecting the pre-calculated range adjustment vector from the plurality of pre-calculated range adjustment vectors using the index.

4. The method of claim 1, wherein the adjusted range is defined by an adjusted lower limit and an adjusted upper limit and generating the adjusted range includes:
   determining whether the adjusted lower limit of the adjusted range falls below a predetermined threshold; and
   normalizing the adjusted range on a condition that the adjusted lower limit of the adjusted range falls below the predetermined threshold.

5. The method of claim 4, wherein the selected pre-calculated range adjustment vector includes a count value and wherein normalizing the adjusted range includes multiplying the adjusted range by a multiple of the count value.

6. The method of claim 5, further comprising:
   writing a portion of the data based on the count value.

7. The method of claim 4, wherein the predetermined threshold is less than the initial lower limit of the current range.

8. The method of claim 5, wherein the multiple of the count value is two.

9. A method for encoding data by determining a range, wherein the data includes a sequence of symbols each associated with a probability of occurrence, and the range is indicative of the encoded data, comprising:
   identifying an initial range, wherein the initial range is defined by a lower limit and an upper limit;
   identifying a symbol set from the sequence of symbols, wherein the symbol set includes an ordered combination of symbols;
   selecting, by a processor, a pre-calculated range adjustment vector from a plurality of pre-calculated range adjustment vectors, the pre-calculated range adjustment vector associated with the symbol set, wherein the pre-calculated adjustment vector includes an adjustment length and an increment value;
   generating an adjusted range from the initial range using the pre-calculated range adjustment vector, wherein generating the adjusted range includes:
      setting a lower limit of the adjusted range to a sum of the lower limit of the initial range and the increment value, and
      setting an upper limit of the adjusted range to a sum of the lower limit of the adjusted range and the adjustment length; and
   encoding the symbol set based on the adjusted range; wherein
   each pre-calculated adjustment vector is defined by a respective adjustment length and a respective increment value;
   each pre-calculated adjustment vector is arranged in a list of entries indexed using a plurality of possible initial lengths of the initial range and a plurality of possible symbol sets; and each of the plurality of possible symbol sets is formed of at least two of the symbols arranged in a defined order; and
wherein selecting the pre-calculated range adjustment vector includes:
determining an index based on the symbol set and the length of the initial range; and
selecting the pre-calculated range adjustment vector from the plurality of pre-calculated range adjustment vectors using the index.

10. The method of claim 9, wherein generating the adjusted range includes:
determining whether the lower limit of the adjusted range falls below a predetermined threshold; and
normalizing the adjusted range on a condition that the lower limit of the adjusted range falls below the predetermined threshold.

11. The method of claim 10, wherein the pre-calculated range adjustment vector includes a count value and wherein normalizing the adjusted range includes multiplying the adjusted range by a multiple of the count value.

12. The method of claim 11, wherein the multiple of the count value is two.

13. The method of claim 11, further comprising:
writing a portion of the data based on the count value.

14. The method of claim 9, wherein selecting the pre-calculated range adjustment vector includes:
selecting the pre-calculated range adjustment vector from a table, the table associating each of the plurality of pre-calculated range adjustment vectors with a respective symbol set, each of the respective symbol sets formed of at least two of the symbols arranged in a defined order and each of the plurality of pre-calculated range adjustment vectors defined by a respective increment value and a respective adjustment length.

15. The method of claim 10, wherein the predetermined threshold is less than the lower limit of the initial range.

16. A method for encoding data by determining a range, wherein the data includes a sequence of symbols each associated with a probability of occurrence, and the range is indicative of the encoded data, comprising:

identifying an initial range, wherein the initial range is defined by a lower limit and an upper limit;
identifying a symbol set from the sequence of symbols, wherein the symbol set includes an ordered combination of symbols;
selecting, by a processor, a pre-calculated range adjustment vector from a plurality of pre-calculated range adjustment vectors, the pre-calculated range adjustment vector associated with the symbol set, wherein the pre-calculated adjustment vector includes an adjustment length and an increment value;
generating an adjusted range from the initial range using the pre-calculated range adjustment vector, wherein generating the adjusted range includes:
setting a lower limit of the adjusted range to a sum of the lower limit of the initial range and the increment value,
setting an upper limit of the adjusted range to a sum of the lower limit of the adjusted range and the adjustment length,
determining whether the lower limit of the adjusted range falls below a predetermined threshold, and
normalizing the adjusted range on a condition that the lower limit of the adjusted range falls below the predetermined threshold; and
encoding the symbol set based on the adjusted range; wherein the plurality of pre-calculated range adjustment vectors is arranged in an indexed list of entries, each entry combining a respective range length with one of a plurality of symbol sets and each of the plurality of symbol sets formed of at least two of the symbols arranged in a defined order; and wherein selecting the pre-calculated range adjustment vector includes:
comparing a length of the initial range and the symbol set to the entries in the indexed list of entries to select one entry whose range length equals the length of the initial range and whose symbol set of the plurality of symbol sets matches the symbol set.

17. The method of claim 16, wherein the predetermined threshold is less than the lower limit of the initial range.

* * * * *